United States Patent [19]

Rademacher

[11] 4,222,932
[45] Sep. 16, 1980

[54] POLYARYLENE ARYLATE COMPOSITIONS

[75] Inventor: Leo E. Rademacher, Springfield, Mass.

[73] Assignee: Monsanto Company, St. Louis, Mo.

[21] Appl. No.: 24,926

[22] Filed: Mar. 29, 1979

[51] Int. Cl.$^2$ .................................................. C08K 5/16
[52] U.S. Cl. ..................... 260/45.9 KB; 260/45.7 PH; 260/45.8 R; 252/389 A
[58] Field of Search .................. 260/45.7 PH, 45.8 R, 260/45.9 KB; 252/389 A

[56] References Cited

U.S. PATENT DOCUMENTS

| | | | |
|---|---|---|---|
| 3,310,609 | 3/1967 | Baranauckas et al. | 260/926 |
| 3,538,045 | 11/1970 | Stewart et al. | 260/45.9 KB |
| 3,580,886 | 5/1971 | Stewart et al. | 260/45.9 KB |
| 3,969,306 | 7/1976 | Borman et al. | 260/45.75 P |
| 4,097,431 | 6/1978 | Asahara et al. | 260/45.75 P |

*Primary Examiner*—Donald E. Czaja
*Assistant Examiner*—W. Thompson
*Attorney, Agent, or Firm*—R. Bruce Blance; William J. Farrington; Edward P. Grattan

[57] ABSTRACT

A stabilized polyarylene ester of an aromatic dicarboxylic acid comprising a synergistically effective amount of an aromatic isocyanate and an aliphatic phosphite.

18 Claims, No Drawings

POLYARYLENE ARYLATE COMPOSITIONS

This invention relates to a stabilizer for polyarylene esters, to a stabilized polyarylene ester composition and to a method of stabilizing polyarylene esters, and more particularly to a stabilizer comprising an isocyanate and a phosphite, to a polyarylene ester stabilized with an isocyanate and a phosphite and to a method of stabilizing polyarylene esters with an isocyanate and a phosphite.

Polyarylene esters have many superior properties which make them useful as engineering thermoplastics including good mechanical properties, high heat distortion temperature, good fire retardancy and good solvent resistance. Despite these superior properties, polyarylene esters have a serious deficiency in their lack of hydrolytic stability. To some extent this deficiency has been overcome by adding a phosphite stabilizer.

I have now discovered that polyarylene esters can be more effectively stabilized by adding an aromatic isocyanate and an aliphatic phosphite compound in a synergistically effective amount. More specifically, the polyarylene esters are stabilized against hydrolytic and/or thermal degradation by the addition of a synergistically effective amount of a mixture of an armatic isocyanate and an aliphatic phosphite. Other aspects of the invention are directed to the mixture of isocyanate and phosphite suitable for stabilizing the polyarylene ester, to molded articles produced from the stabilized polyarylene ester and to an a process of stabilizing the polyarylene ester by mixing the polyarylene ester in powder or pellet form with a synergistically effective amount of a stabilizing mixture of isocyanate and phosphite followed by melt blending of the admixture.

The polyarylene ester is the condensation product of at least one $C_8$ to $C_{25}$ armoatic dicarboxylic acid and at least one $C_6$ to $C_{25}$ diphenol. While essentially any suitable $C_8$ to $C_{25}$ aromatic dicarboxylic acid and admixture thereof can be used in the preparation of the polyarylene esters, the preferred aromatic dicarboxylic acids are selected from the group consisting of isophthalic acid, terephthalic acid, bibenzoic acid, naphthalene dicarboxylic acid, bis(4-carboxyphenyl)methane, 1,2-bis(4-carboxyphenyl)ethane, 2,2-bis(4-carboxyphenyl)propane, bis(4-carboxyphenyl)oxide, bis(4-carboxyphenyl)sulfide and bis(4-carboxyphenyl)sulfone and alkyl and halogen substitutive derivatives thereof. Similarly, while essentially any suitable $C_6$ to $C_{25}$ diphenol and admixture thereof can be used in the preparation of the polyarylene esters, the preferred diphenols are selected from the group consisting of resorcinol, hydroquinone, diphenol, dihydroxynaphthalene, bis(4-hydroxyphenyl)methane, 1,2-bis(4-hydroxyphenyl)ethane, bis(4-hydroxyphenyl)sulfide, 2,2-bis(4-hydroxyphenyl)propane, bis(4-hydroxyphenyl)oxide and bis(4-hydroxyphenyl)sulfone and alkyl and halogen substitutive derivatives thereof. Among the especially preferred polyarylene esters are the condensation products of bis(4-hydroxyphenyl)methane, 1,2-bis(4-hydroxyphenyl)ethane and 2,2-bis(4-hydroxyphenyl)propane and isophthalic and terephthalic acids.

The weight average molecular weight of the polyarylene esters is at least about 10,000 and is preferably in the range of about 20,000 to about 100,000. The molecular weight is selected to provide a balance in processability and mechanical properties of the polyarylene ester.

The polyarylene ester can be produced by an convenient method such as by melt condensation or solvent condensation of mixtures of aromatic dicarboxylic acids and diphenol diesters selected to provide polyarylene esters of the desired molecular weight and processability. They can be produced by melt or solution polymerization of selected mixtures of phenol esters of aromatic dicarboxylic acids and diphenols and by interfacial polymerization of salts of diphenols and aromatic dicarboxylic acid dihalides. Thus, while the combination is formally a condensate of diacid and diphenol, in practice the reactants are diacids and diphenol esters, or phenyl esters of diacids and diphenols, or salts of diphenols and diacid halides.

A preferred method of peparation is the melt condensation of mixtures of aromatic dicarboxylic acids and diphenol diesters. Another preferred method is the melt condensation of mixtures of aromatic dicarboxylic acids and diphenol diesters to a prepolymer stage followed by solid state polymerization to advance the polymer to the desired molecular weight. When the polyarylene ester is prepared by these preferred methods, the polyester molecules are terminated by phenolic ester and aromatic carboxylic acid groups. The concentration of armoatic carboxylic acid groups is generally at least about 5 microequivalents per gram of polyester and with polyesters in the preferred molecular weight range the concentration is generally in the range of about 10 to about 200 microequivalents per gram of polyester.

The polyarylene ester is stabilized with a synergistic amount of an isocyanate and an aliphatic phosphite. The amount of isocyanate used is preferably from about 0.1 to about 3 equivalents per equivalent of free carboxyl in the polyarylene ester, and preferably is in the range of about 0.5 to about 2 equivalents. When more than 3 equivalents of isocyanate per equivalent of free carboxyl is used the polyarylene ester tends to develop excessive color. Indeed even when the amount of isocyanate is less than 2 equivalents per equivalent of free carboxyl, a considerable increase in color is observed if it is used as the only stabilizer. However, when the combination of isocyanate and phosphite is used, as well as an improvement in hydrolytic stability which is demonstrated by a significant retention of molecular weight, there is a marked decrease in discoloration of the polyester. The ratio of phosphite to isocyanate can range widely from about 0.01 to about 10 equivalents per equivalent of isocyanate and is preferably in the range of about 0.1 to about 1.0 equivalents. High ratios of phosphite may adversely affect the color and the mechanical properties of the polyester although they may improve its flame retardancy.

By isocyanates I mean monoisocyanates, monoisothiocyanates, diisocyanates, diisothiocyanates, polyisocyanates and polyisothiocyanates of molecular weight less than about 1000.

Basically, any aromatic isocyanate of the above types are suitable for the manufacture of the stabilized polyarylene esters. As an example of aromatic monoisocyanates, mention may be made of phenyl isocyanate, tolyl isocyanates, xylyl isocyanates, biphenyl isocyanates, and naphthyl isocyanates. Examples of aromatic diisocyanates are phenylene diisocyanates, tolylene diisocyanates, xylylene diisocyanates, biphenyl diisocyanates, naphthylene diisocyanates, 4,4'-diphenylmethane diisocyanate, 4,4'-diphenylsulfone diisocyanate, 4,4'-diphenylether diisocyanate and the like. In place of the above it is possible to use the corresponding isothiocyanates.

Masked isocyanates or isocyanate-donating compounds may be used as a means of introducing the isocyanate without exposing it to the hydrolyzing effect of atmospheric moisture. Masked isocyanates are for example dimeric isocyanates and isocyanate donating compounds are for example adducts of isocyanates with acidic compounds containing OH, NH, CH or SH such as the adducts of tolylene-2,4-diisocyanate with phenol, pyrrolidone or caprolactam.

The phosphite components of the invention are aliphatic phosphites of boiling point greater than about 300° C. and of molecular weight less than about 2000. They includes phosphites defined by the following six structures:

Examples of divalent alkyl radicals having 2–12 carbon atoms include ethylene, propylene, 2,2-dimethyl trimethylene, decamethylene, and the like.

Examples of divalent poly(alkylene oxide) radicals having 2–12 carbon atoms include $$-(CH_2-O-CH_2)-, -(CH_2CH_2OCH_2CH_2)-,$$
$$-(CH_2CHOCH_2-CH)-,$$
$$\quad\quad | \quad\quad\quad |$$
$$\quad\quad CH_3 \quad\quad CH_3$$
$$-(CH_2CH_2CH_2CH_2OCH_2CH_2CH_2CH_2)-$$

A preferred compound is bis(neopentylglycol)-triethylene glycol diphosphite corresponding to the structure:

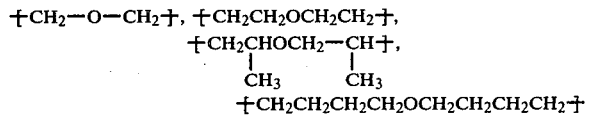  (4)

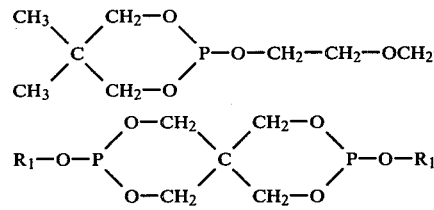

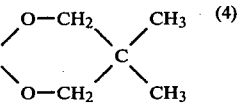

where $R_1$ is a radical as defined above.

Preferred compounds include di(stearyl) pentaerythritol diphosphite corresponding to the structure,

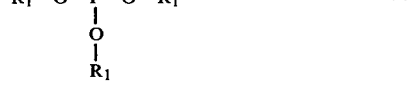  (1)

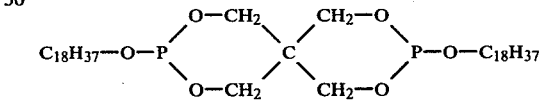

where $R_1$ is a substituted or unsubstituted alkyl, cycloalkyl or aralkyl radical having 1–18 carbon atoms. Examples of such radicals include methyl, ethyl, propyl, butyl, 2,2-dimethylbutyl, 2,2-dimethylhexyl, n-pentyl, n-hexyl, cyclopentyl, cyclohexyl, 2-ethylhexyl, n-octyl, iso-octyl, n-nonyl, n-decyl, iso-decyl, dodecyl or lauryl, hexadecyl or stearyl, phenylethyl, tolylethyl, cyclohexylethyl and the like. Such compounds include triisooctyl phosphite, triisodecyl phosphite, trilauryl phosphite and tristearyl phosphite.

di(isodecyl) pentaerythritol diphosphite and di(lauryl) pentaerythritol diphosphite.

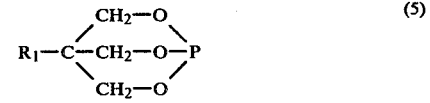  (5)

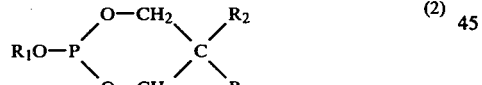  (2)

where $R_1$ is a radical as defined above, and

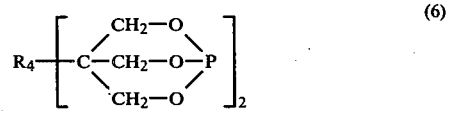  (6)

where $R_1$ is a radical as defined above and $R_2$ and $R_3$ are hydrogen or $R_1$ radials or substituted or unsubstituted aryl radicals having 6–18 carbon atoms such as phenyl, tolyl, naphthyl and the like. Preferred compounds include lauryl neopentyl glycol phosphite, stearyl neopentyl glycol phosphite and phenylethyl neopentyl glycol phosphite.

where $R_4$ is a divalent radical as defined above. A preferred compound is dipentaerythritol diphosphite corresponding to the structure

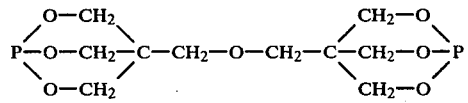

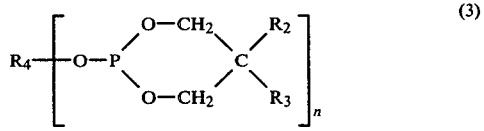  (3)

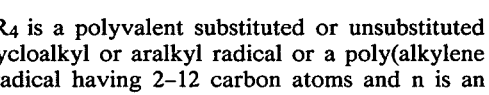

where $R_4$ is a polyvalent substituted or unsubstituted alkyl, cycloalkyl or aralkyl radical or a poly(alkylene oxide) radical having 2–12 carbon atoms and n is an integer of 2–4, and $R_2$ and $R_3$ are radicals as defined above.

These phosphites and methods for their preparation are well known in the art. Of the six groups set forth above, the cyclic phosphites of groups 4, 5 and 6 are especially preferred.

The compositions of this invention can be formed according to methods well known in the art, such as melt blending, extrusion, and the like. The order of addition of the components of the composition is immaterial. In a preferred embodiment, pellets of polyarylene ester are coated by tumbling the pellets with a mixture of isocyanate and phosphite until the mixture is absorbed by the polyester. The admixture is then placed in the hopper of an extruder and extruded under high back pressure. In another preferred embodiment the polyarylene ester is tumble mixed with the phosphite at a temperature above the melting point of the phosphite until the phosphite is absorbed by the polyester. The polyester is then cooled to room temperature and is tumble mixed with the isocyanate until it has in turn been absorbed. The admixture is then placed in the hopper of an extruder and extruded under high back pressure.

The compositions of this invention can be extruded into sheets or molded into various articles by conventional molding techniques, such as injection molding.

The compositions of this invention can contain various other materials useful for modifying the properties of the composition. For example, the composition can contain mold release agents, glass fibers, flame retardants, pigments, stabilizers, extenders and numerous other materials commonly incorporated into molding plastics.

The invention is further described and illustrated in the examples which follow. The examples should not be construed as limiting the scope of the invention to their details. All parts and percentages are by weight unless otherwise indicated.

EXAMPLE 1

Preparation and Formulation of Polyisophthalate of 2,2-Bis(4-Hydroxyphenyl)Propane An equimolar mixture of 2,2-bis(4-acetoxyphenyl)-propane (Bisphenol A diacetate) and isophthalic acid is heated gradualy to 290° C. in a stirred vessel under gradually increasing vacuum to remove the acetic acid which is liberated. When the melt viscosity of the condensate reaches a level such that stirring becomes difficult the melt is drained from the reaction vessel and crystallized. The crystallized polymer is subjected to solid state polymerization under vacuum at 280° C. until the inherent viscosity reaches 0.65 dl/g (in 40/60 by weight tetrachloroethane/phenol solution at 25° C.). The polymer is then extruded at 350° C. and pelletized. The polymer has an inherent viscosity of 0.62 and a carboxylic acid content of 40 microequivalents per gram ($\mu$eq./g), determined by potentiometric titration of a solution of the polymer in a 2,6-dimethylphenol/chloroform/ethanol mixture with an ethanolic solution of potassium hydroxide.

The pellets are dried in a vacuum oven to <0.02% mixture and then stored under nitrogen. The polymer pellets are used to prepare the following formulations.

Control #1—The polymer pellets without additives.

Control #2—To 100 parts of polymer pellets at room temperature, 1.33 parts of m-tolyl isocyanate are added. This equals 100 microequivalents of isocyanate per gram of polymer. The mixture is stirred until all the isocyanate is absorbed by the polymer.

Control #3—To 100 parts of polymer pellets at 75° C., 0.5 parts of di(stearyl)pentaerythritol diphosphite is added. The mixture is stirred to disperse the phosphite ester.

Example 1—To 100 parts of polymer pellets at 75° C., 0.5 parts of di(stearyl)pentaerythritol diphosphite is added. The mixture is stirred and cooled to room temperature, then 1.33 parts of m-tolyl isocyanate are added. The mixture is stirred until all the isocyanate is absorbed.

A. EXTRUSION OF THE FORMULATIONS

Each of the above formulations is extruded at 300° C. using a 1" laboratory extruder equipped with a two stage screw and a vent open to the atmosphere. The open vent allows the $CO_2$ which is generated by the reaction of isocyanate and carboxylic acids to escape. The extrudates are pelletized, after which inherent viscosity and residual carboxylic acid content are measured as described above.

B. DETERMINATION OF HYDROLYTIC STABILITY

Samples of the extruded pellets are placed in open dishes and aged at 150° C. in an atmosphere that is nearly pure steam plus a minor amount of air. Samples are removed periodically and tested for inherent viscosity.

The properties of the formulations as obtained from the extruder and after aging in 150° C. steam for 72 hours are given in Table I. It is seen that the formulation of this invention, Example 1, is more resistant to hydrolysis than the controls. It is also seen that the use of isocyanate alone, without added phosphite ester results in a highly colored extrudate.

TABLE I

| Sample | Inherent Viscosity Unaged | —COOH Unaged $\mu$eq/g. | Color Unaged | Inherent Viscosity after Aging 72 hr. in 150° C. Steam |
| --- | --- | --- | --- | --- |
| Control #1 | .60 | 40 | Lt. Amber | .20 |
| Control #2 | .56 | 3 | Dk. Brown | .22 |
| Control #3 | .61 | 32 | Lt. Amber | .26 |
| Example 1 | .59 | 3 | Amber | .39 |

EXAMPLE 2

Another sample of polyisophthalate of 2,2-bis(4-hydroxyphenyl)propane is prepared essentially as in Example 1. This polymer has an inherent viscosity of 0.66 and a carboxylic acid content of 30 $\mu$eq/g. The dried polyester pellets are used to prepare the various formulations listed in Table II. The methods of addition of the additives, extrusion of the mixture and aging in steam are as described in Example 1. From the results it can be seen that:

1. An excessive amount of either isocyanate or phosphite ester results in highly colored extrudate and/or less than optimum hydrolytic stability.

2. A minimum of about 8 microequivalents of the hexavalent phosphite ester per gram of polyester is required for optimum color and hydrolytic stability.

TABLE II

| Additives | | | Properties After Extrusion | | | Inherent Viscosity After Aging 72 hr. in 150° C. Steam |
| --- | --- | --- | --- | --- | --- | --- |
| Isocyanate (1) | $\mu$eq/g. Polymer | Phosphite Wt. % | Inherent Viscosity | —COOH $\mu$eq/g | Color | |
| None | — | None | .61 | 30 | Lt. Amber | .17 |
| mTI | 35 | 0.1 | .65 | 2 | Lt. Amber | .36 |
| " | 35 | 0.3 | .64 | 3 | Lt. Amber | .37 |
| " | 50 | 0.05 | .63 | 2 | Dk. | .29 |

TABLE II-continued

| Additives | | | Properties After Extrusion | | | Inherent Viscosity After Aging 72 hr. in 150° C. Steam |
|---|---|---|---|---|---|---|
| Isocyanate (1) | μeq/g. Polymer | Phosphite Wt. % | Inherent Viscosity | —COOH μeq/g | Color | |
| " | 50 | 0.3 | .62 | — | Brown Lt. Amber | .45 |
| " | 50 | 0.5 | .60 | — | Lt. Amber | .34 |
| " | 100 | 0.1 | .58 | 2 | Brown | .25 |
| " | 100 | 0.3 | .58 | — | " | .33 |
| " | 150 | 0.5 | .55 | — | " | .26 |
| pTI | 50 | 0.3 | .66 | 4 | Lt. Amber | .40 |
| 2,5-D | 50 | 0.3 | .63 | — | Brown | .40 |

(1) mTI and pTI = m-tolyl isocyanate and p-tolyl isocyanate, 2,5-D = 2,5-dichlorophenyl isocyanate.

EXAMPLE 3

Another sample of polyisophthalate of 2,2-bis(4-hydroxyphenyl)propane is prepared by the method of Example 1. It has an inherent viscosity of 0.60 and a carboxylic acid content of 60 μeq/g. Portions are mixed with various isocyanates and phosphite esters then extruded and tested as in Examples 1 and 2. The formulations and results are given in Table III. The results show that:

1. Both diisocyanates and monoisocyanates, or combinations of the two are effective stabilizers when used in combination with a phosphite ester of the type described in this invention.

2. An aromatic phosphite ester is less effective when used in combination with an isocyanate since it causes the development of a dark brown discoloration.

3. An aliphatic isocyanate is rather ineffective when it is used in combination with phosphite ester since it gave little improvement in stability of the polyester.

TABLE III

| Additives | | | | Properties After Extrusion | | | Inherent Viscosity After Aging 72 hr. in 150° C. Steam |
|---|---|---|---|---|---|---|---|
| Isocyanate (1) | μ eq/g. Polymer | Phosphite (2) | % by Weight | Inherent Viscosity | —COOH μ eq/g. | Color | |
| None | — | None | — | .60 | 62 | Lt. Amber | .15 |
| TDI | 75 | DSPDP | 0.2 | .83 | 2 | Brown | .44 |
| TDI | 35 | " | 0.2 | .67 | — | Amber | .40 |
| mTI | 35 | | | | | | |
| ODI | 75 | " | 0.2 | .60 | — | Lt. Amber | .20 |
| mTI | 90 | TNPP | 0.3 | .56 | — | Dk. Brown | .35 |

(1) TDI = tolylene-2,4-diisocyanate
mTI = m-tolyl isocyanate
ODI = octadecyl isocyanate.
(2) DSPDP = di(stearyl) pentaerythritol diphosphite
TNPP = tris(nonylphenyl) phosphite.

EXAMPLE 4

A polyarylene ester is prepared from 1,2-bis(4-acetoxyphenyl)ethane and isophthalic acid in a manner similar to that described in Example 1. Formulations of this polymer (BPE-I) commercially available polyethylene terephthalate (PET), and polytetramethylene terephthalate (PBT) are prepared by mixing them with an isocyanate and a phosphite ester. The admixtures are extruded and tested by the procedures of Example 1. The results are given in Table IV. It can be seen that the isocyanate-phosphite ester stabilizer is effective in improving the hydrolytic stability of the all aromatic polyarylene ester but not effective with the polyalkylene esters, polyethylene and polytetramethylene terephthalates.

TABLE IV

| Additives | | | Properties After Extrusion | | Inherent Viscosity After Aging 72 hr. in 150° C. Steam |
|---|---|---|---|---|---|
| Polymer | mTI μeq/g. | DSPDP | ηinh | Color | |
| BPE-I | 0 | 0 | .91 | Lt. Amber | .27 |
| " | 50 | 0.3 | .87 | " | .43 |
| PET | 0 | 0 | .52 | White | .19 |
| " | 50 | 0.3 | .56 | Amber | .19 |
| PBT | 0 | 0 | .87 | White | .36 |
| " | 50 | 0.3 | .65 | Amber | .33 |

BPE-I - polyisophthalate of 1,2-bis(4-hydroxyphenyl)ethane.
PET - polyethylene terephthalate.
PBT - polybutylene terephthalate.
mTI - m-tolyl isocyanate.
DSPDP - di(stearyl)pentaerythritol diphosphite.

What is claimed is:

1. A stabilizer composition for a polyarylene ester of an aromatic dicarboxylic acid, comprising a synergistically effective mixture of an aromatic isocyanate of molecular weight less than about 1000 and an aliphatic phosphite of boiling point greater than about 300° C. and molecular weight less than about 2000, wherein the ratio of phosphite to isocyanate is in the range of from about 0.01 to about 10 equivalents said polyarylene ester being the condensation product of at least one $C_8$–$C_{25}$ aromatic dicarboxylic acid and at least one $C_6$–$C_{25}$ diphenol.

2. The stabilizer composition of claim 1 wherein the isocyanate is selected from the group consisting of phenyl isocyanate, tolyl isocyanates, xylyl isocyanates, biphenyl isocyanates, naphthyl isocyanates, phenylene diisocyanates, tolylene diisocyanates, xylylene diisocyanates, biphenylene diisocyanates, naphthylene diisocyanates, 4,4'-diphenylmethane diisocyanate, 4,4'-diphenylsulfone diisocyanate, and 4,4'-diphenylether diisocyanate.

3. The stabilizer composition of claim 1 wherein the phosphite corresponds to the structure

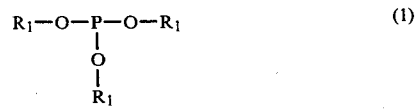

(1)

where $R_1$ is a substituted or unsubstituted alkyl, cycloalkyl or aralkyl radical having 1–18 carbon atoms,

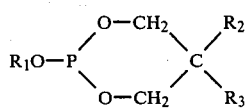

where $R_1$ is a radical as defined above and $R_2$ and $R_3$ are hydrogen or $R_1$ radicals or substituted or unsubstituted aryl radicals having 6–18 carbon atoms,

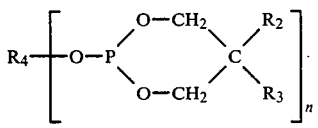

where $R_4$ is a polyvalent substituted or unsubstituted alkyl, cycloalkyl or aralkyl radical or a poly(alkylene oxide) radical having 2–12 carbon atoms and n is an integer of 2–4, and $R_2$ and $R_3$ are radicals as defined above,

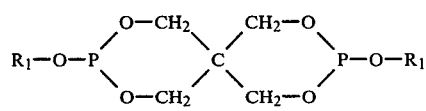

where $R_1$ is a radical as defined above,

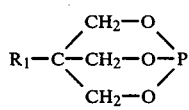

where $R_1$ is a radical as defined above, or

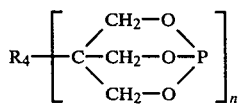

where $R_4$ is a polyvalent radical as defined above.

4. The stabilizer composition of claim 1 wherein the phosphite is selected from the group consisting of lauryl neopentylglycol phosphite, stearyl neopentylglycol phosphite, bis(neopentylglycol) trimethylene glycol diphosphite, di(isodecyl) pentaerythritol diphosphite, di(lauryl) pentaerythritol diphosphite, di(stearyl) pentaerythritol diphosphite and dipentaerythritol diphosphite.

5. The stabilizer composition of claim 1 wherein the isocyanate is selected from the group consisting of phenyl isocyanate, tolyl isocyanates, xylyl isocyanates, biphenyl isocyanates, naphthyl isocyanates, phenylene diisocyanates, tolylene diisocyanates, xylylene diisocyanates, biphenylene diisocyanates, naphthalene diisocyanates, 4,4′-diphenylmethane diisocyanate, 4,4′-diphenylsulfone diisocyanate, and 4,4′-diphenylether diisocyanate and the phosphite is selected from the group consisting of lauryl neopentylglycol phosphite, stearyl neopentylglycol phosphite, bis(neopentylglycol) triethylene glycol diphosphite, di(isodecyl) pentaerythritol diphosphite, di(lauryl) pentaerythritol diphosphite, di(stearyl) pentaerythritol diphosphite and dipentaerythritol diphosphite and wherein the ratio of phosphite to isocyanate is in the range from about 0.1 to about 1 equivalents.

6. The stabilizer composition of claim 5 wherein the phosphite is di(stearyl) pentaerythritol diphosphite.

7. A polyarylene ester of an aromatic dicarboxylic acid stabilized with a synergistically effective mixture of an aromatic isocyanate of molecular weight less than 1000 and an aliphatic phosphite of boiling point greater than about 300° C. and molecular weight less than about 2000, wherein the ratio of phosphite to isocyanate is in the range of about 0.01 to 10 equivalents and the ratio of isocyanate to polyarylene ester acid groups is in the range of about 0.1 to about 3 equivalents said polyarylene ester being the condensation product of at least one $C_8$–$C_{25}$ aromatic dicarboxylic acid and at least one $C_6$–$C_{25}$ diphenol.

8. The polyarylene ester of claim 7 wherein the isocyanate is selected from the group consisting of phenyl isocyanate, tolyl isocyanates, xylyl isocyanates, biphenyl isocyanates, naphthyl isocyanates, phenylene diisocyanates, tolylene diisocyanates, xylylene diisocyanates, biphenylene diisocyanates, naphthylene diisocyanates, 4,4′-diphenylmethane diisocyanate, 4,4′-diphenylsulfone diisocyanate, and 4,4′-diphenylether diisocyanate.

9. The polyarylene ester of claim 7 wherein the phosphite corresponds to the structure:

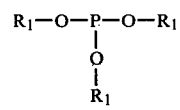

where $R_1$ is a substituted or unsubstituted alkyl, cycloalkyl or aralkyl radical having 1–18 carbon atoms,

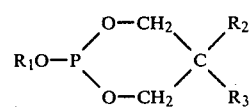

where $R_1$ is a radical as defined above and $R_2$ and $R_3$ are hydrogen or $R_1$ radicals or substituted or unsubstituted aryl radicals having 6–18 carbon atoms,

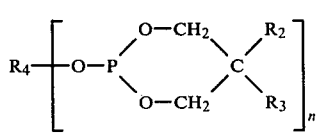

where $R_4$ is a polyvalent substituted or unsubstituted alkyl, cycloalkyl or aralkyl radical or a poly(alkylene oxide) radical having 2–12 carbon atoms and n is an integer of 2–4, and $R_2$ and $R_3$ are radicals as defined above,

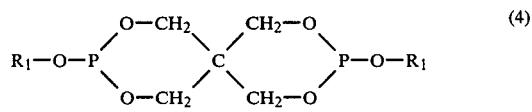

where $R_1$ is a radical as defined above,

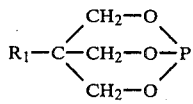

where R₁ is a radical as defined above, or

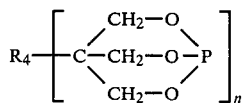

where R₄ is a polyvalent radical as defined above.

10. The polyarylene ester of claim 7 wherein the phosphite is selected from the group consisting of lauryl neopentylglycol phosphite, stearyl neopentylglycol phosphite, bis(neopentylglycol) trimethylene glycol diphosphite, di(isodecyl) pentaerythritol diphosphite, di(lauryl) pentaerythritol diphosphite, di(stearyl) pentaerythritol diphosphite and dipentaerythritol diphosphite.

11. The polyarylene ester of claim 7 wherein the isocyanate is selected from the group consisting of phenyl isocyanate, tolyl isocyanates, xylyl isocyanates, biphenyl isocyanates, naphthyl isocyanates, phenylene diisocyanates, tolylene diisocyanates, xylylene diisocyanates, biphenylene diisocyanates, naphthalene diisocyanates, 4,4'-diphenylmethane diisocyanate, 4,4'-diphenylsulfone diisocyanate, and 4,4'-diphenylether diisocyanate and the phosphite is selected from the group consisting of lauryl neopentylglycol phosphite, stearyl neopentylglycol phosphite, bis(neopentylglycol) triethylene glycol diphosphite, di(isodecyl) pentaerythritol diphosphite, di(lauryl) pentaerythritol diphosphite, di(stearyl) pentaerythritol diphosphite and dipentaerythritol diphosphite and wherein the ratio of phosphite to isocyanate is in the range of about 0.1 to about 1.0 equivalents and the ratio of isocyanate to polyarylene ester carboxylic acid groups is in the range from about 0.5 to about 2 equivalents.

12. The polyarylene ester of claim 11 wherein the phosphite is di(stearyl) pentaerythritol diphosphite.

13. The polyarylene ester of claim 7, 8, 9, 11 or 12 wherein the polyarylene ester is the condensation product of a diphenol selected from the group consisting of resorcinol, hydroquinone, diphenol, dihydroxynaphthalene, bis(4-hydroxyphenyl)methane, 1,2-bis(4-hydroxyphenyl)ethane, 2,2-bis(4-hydroxyphenyl)propane, bis(4-hydroxyphenyl)oxide, bis(4-hydroxyphenyl)sulfide, and bis(4-hydroxyphenyl) sulfone and a dicarboxylic acid selected from the group consisting of isophthalic acid, terephthalic acid, bibenzoic acid, naphthalene dicarboxylic acid, bis(4-carboxyphenyl) methane, 1,2-bis(4-carboxyphenyl)ethane, 2,2-bis(4-carboxyphenyl)propane, bis(4-carboxyphenyl)oxide, bis(4-carboxyphenyl)sulfide and bis(4-carboxyphenyl)sulfone.

14. The polyarylene ester of claim 7, 8, 9, 11 or 12 wherein the polyarylene ester is the condensation product of a diphenol selected from the group consisting of bis(4-hydroxyphenyl)methane, 1,2-bis(4-hydroxyphenyl) ethane and 2,2-bis(4-hydroxyphenyl)propane and a dicarboxylic acid selected from the group consisting of isophthalic and terephthalic acids.

15. A molded article produced from the composition of claim 7, 8, 9, 11 or 12.

16. A process for stabilization of a polyarylene ester of an aromatic dicarboxylic acid which comprises mixing the polyarylene ester in powder or pellet form with a synergistically effective amount of an aromatic isocyanate of molecular weight less than about 1000 and an aliphatic phosphite of boiling point greater than about 300° C. and molecular weight less than about 2000 and melt blending the mixture, wherein the ratio of phosphite to isocyanate is in the range from about 0.01 to about 10 equivalents and the ratio of isocyanate to polyarylene ester acid groups is in the range from about 0.1 to about 3 equivalents said polyarylene ester being the condensation product of at least one $C_8$–$C_{25}$ aromatic dicarboxylic acid and at least one $C_6$–$C_{25}$ diphenol.

17. The process of claim 16 wherein the ratio of phosphite to isocyanate is in the range from about 0.1 to about 1.0 equivalents and the ratio of isocyanate to polyarylene ester carboxylic acid groups is in the range from about 0.5 to about 2 equivalents.

18. The process of claim 1 or 17 wherein the isocyanate is selected from the group consisting of phenyl isocyanate, tolyl isocyanates, xylyl isocyanates, biphenyl isocyanates, naphthyl isocyanates, phenylene diisocyanates, tolylene diisocyanates, xylylene diisocyanates, biphenyl diisocyanates, naphthalene diisocyanates, 4,4'-diphenylmethane diisocyanate, 4,4'-diphenylsulfone diisocyanate, and 4,4'-diphenylether diisocyanate and the phosphite is selected from the group consisting of lauryl neopentylglycol phosphite, stearyl neopentylglycol phosphite, bis(neopentylglycol) triethylene glycol diphosphite, di(isodecyl) pentaerythritol diphosphite, di(lauryl) pentaerythritol diphosphite, di(stearyl) pentaerythritol diphosphite and dipentaerythritol diphosphite.

* * * * *